R. RAWLING & J. T. WHITE.
VENTILATING SHAFT TOP.
APPLICATION FILED JULY 8, 1909.

949,683.

Patented Feb. 15, 1910.
4 SHEETS—SHEET 1.

R. RAWLING & J. T. WHITE.
VENTILATING SHAFT TOP.
APPLICATION FILED JULY 8, 1909.

949,683.

Patented Feb. 15, 1910.
4 SHEETS—SHEET 2.

Witnesses:

Inventors:
Robert Rawling
John Thomas White
by Klinger atty

R. RAWLING & J. T. WHITE.
VENTILATING SHAFT TOP.
APPLICATION FILED JULY 8, 1909.
949,683.
Patented Feb. 15, 1910.
4 SHEETS—SHEET 3.
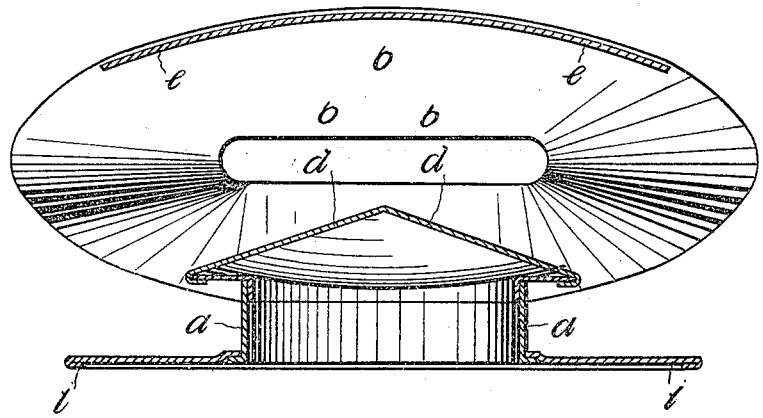
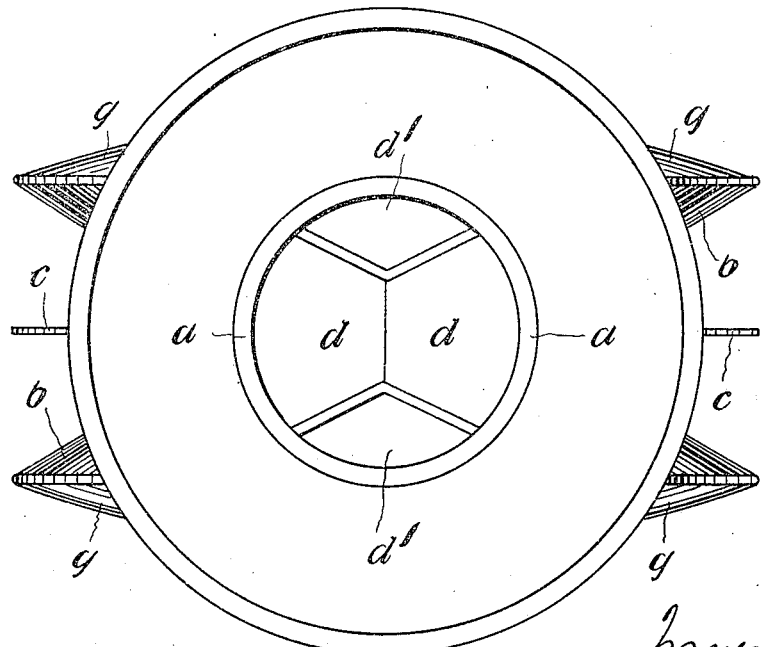

R. RAWLING & J. T. WHITE.
VENTILATING SHAFT TOP.
APPLICATION FILED JULY 8, 1909.

949,683.

Patented Feb. 15, 1910.
4 SHEETS—SHEET 4.

Witnesses:

Inventors:
Robert Rawling
John Thomas White

UNITED STATES PATENT OFFICE.

ROBERT RAWLING AND JOHN THOMAS WHITE, OF NORTH SHIELDS, ENGLAND.

VENTILATING-SHAFT TOP.

949,683.    Specification of Letters Patent.    Patented Feb. 15, 1910.

Application filed July 8, 1909. Serial No. 506,631.

*To all whom it may concern:*

Be it known that we, ROBERT RAWLING, tinsmith, and JOHN THOMAS WHITE, engineer, citizens of Great Britain, and residents, respectively, of 23 Sidthorpe street and Coatham House, Kirton Park Terrace, North Shields, in the county of Northumberland, England, have invented certain new and useful Improvements in Ventilating-Shaft Tops, of which the following is a specification.

This invention relates to improvements in ventilating shaft tops for ships, buildings, carriages and other structures, the object being the provision of a more efficient induced draft than heretofore, in the uptake for the removal of foul air.

The invention consists in the employment of two hollow frustums of cones, pyramids, etc., situated substantially on a common axis at right angles to the uptake, with their smaller ends open and toward each other, but spaced apart. Between the facing apertures of the frustums, a baffle is introduced and in the side of each frustum an aperture is provided which is in communication with the uptake. The frustums are arranged in a casing having an air way across the open ends of the frustums and when in use the air passing through this airway induces a draft in the frustums and by reason of their communication with it, in the uptake; thus removing foul air from the carriage compartment or other portion of a structure on which the ventilator top is used.

Figure 1:
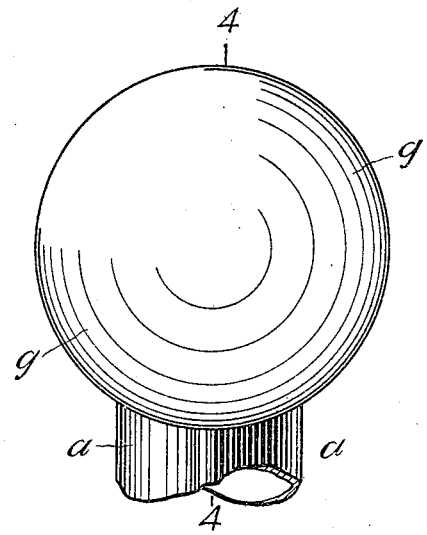
Figure 2:
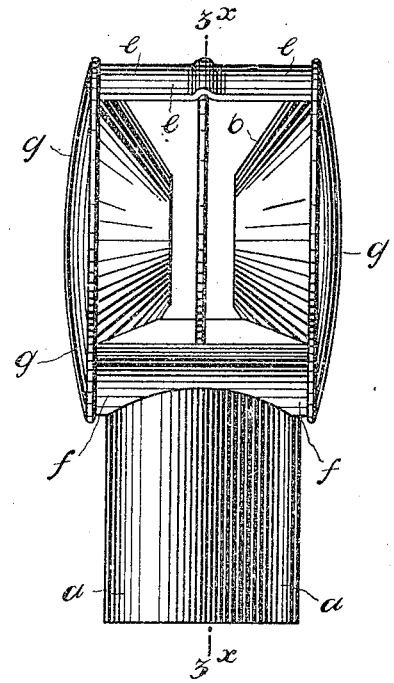
Figure 3:
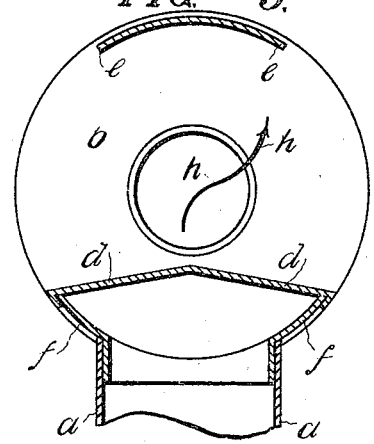
Figure 4:
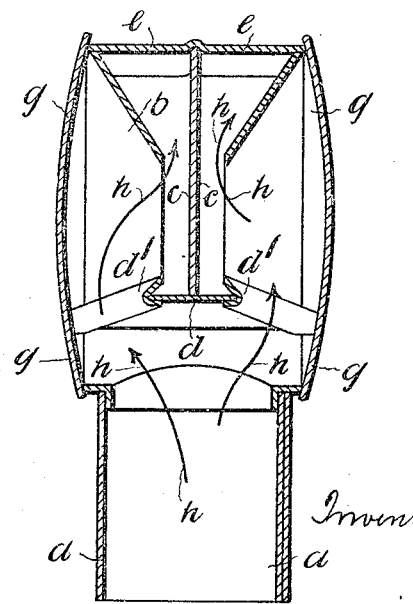
Figure 5:
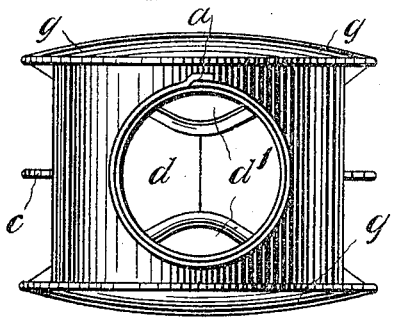
Figure 6:
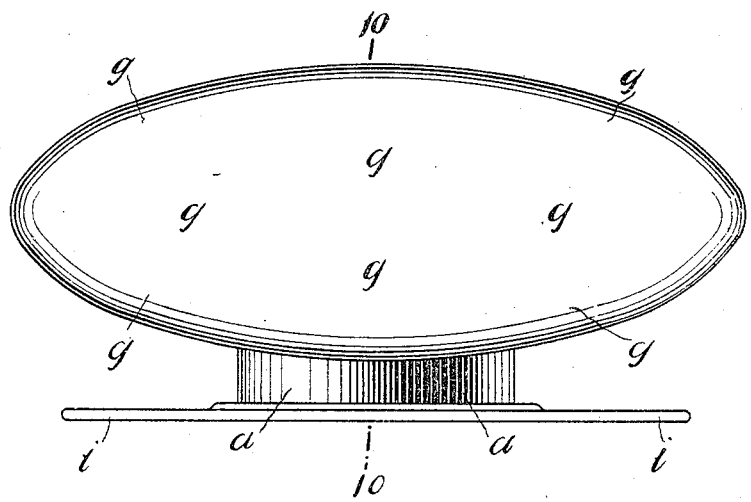
Figure 7:
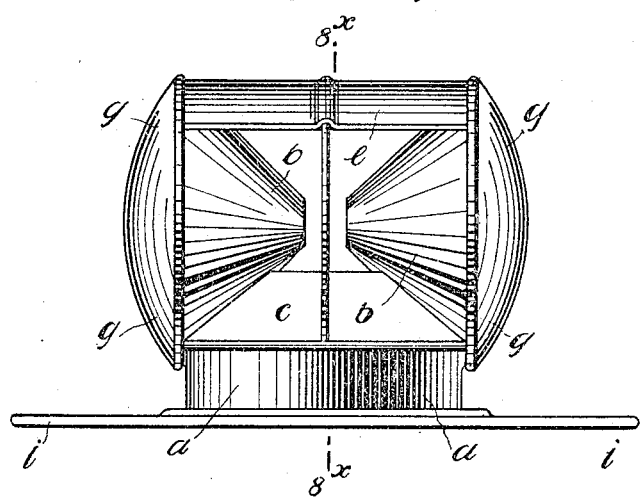
Figure 10:
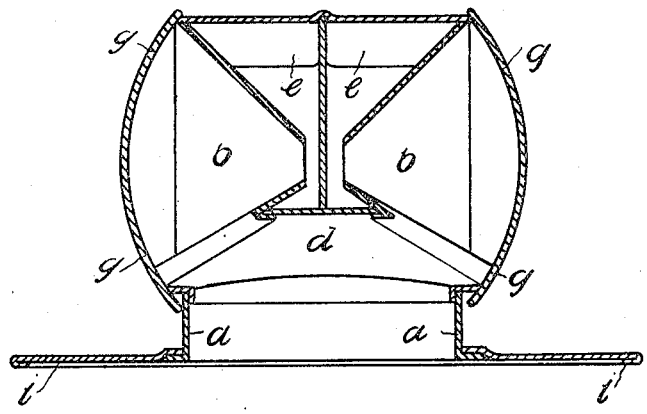

On the accompanying drawings: Figures 1 and 2 are elevations, taken at right angles to each other, of a top suitable for use on ships' ventilators, chimneys, fume pipes from gas ovens, geysers and the like. Fig. 3. is a section thereof on line 3ˣ—3ˣ of Fig. 2. Fig. 4. is a section on line 4—4 of Fig. 1. Fig. 5. is an inverted plan. Figs. 6 and 7 are elevations at right angles to each other, of a modified form of top more suitable for railway and like work. Fig. 8. is a section thereof on line 8ˣ—8ˣ of Fig. 7. Fig. 9. is an inverted plan, and Fig. 10 is a section on line 10—10— of Fig. 6.

In carrying out the invention we mount upon the top of the cylindrical uptake or shaft $a$, two hollow truncated cones, or frustums $b$, situated on a common center line at right angles to the uptake $a$. The tops of the frustums $b$ open toward one another, and at the same time are spaced a little apart at a convenient distance from the center line of the uptake. In this center line midway between the two frustums we introduce a baffle plate $c$, preferably in the form of a diaphragm agreeing in outline with the base of the frustum, and this baffle plate is secured at its inner end to an arched baffle strip $d$ fixed across the top of the uptake $a$, such strip being curved along its two edges which join corresponding openings $d^1$ in the curved surfaces of the frustums as seen at Fig. 5. If desired a pair of baffle plates may be used of concave form in place of baffle $c$ and in either case if desired the strip $d$ may be flat although arching it is preferred as it enables rain or moisture to be thrown off that would otherwise collect there. The upper end of the baffle plate $c$ is stayed by a plate $e$ which extends across from the base of one frustum to the opposite one, and this plate with the curved plates $f$ at the junction with the uptake, and the covers $g$ over the bases of the frustums form what may be termed the outer casing carrying the frustums. The covers $g$ over the bases of the frustums are preferably dished as shown.

The openings $d^1$ in the sides of the frustums form ample and spacious passages for the flow of the foul air as will be evident from Fig. 4 in which the arrows $h$ denote the direction traversed by same.

We do not limit ourselves to the details of construction as suggested by the drawings, but without departing from the nature of the invention as previously foreshadowed, may adopt any desired method of construction.

In the form of top represented at Figs. 6 to 9 the same letters of reference and general description apply, but it will be noted that the frustums $b$ are those of flattened conoidal bodies. This gives an arrangement requiring less head room which is a desideratum in railway work and in our invention this is achieved without reducing the size of the openings for the passage of the foul air. $i$ represents a base or securing flange around the uptake $a$.

What we claim and desire to secure by Letters Patent is:—

1. A ventilator top wherein two hollow frustums are mounted above an uptake, the tops of the frustums facing each other, but being spaced apart and separated by a suitable baffle arrangement and the said tops being open to an air way while the sides of the frustums are in communication with the uptake.

2. A ventilator top wherein two hollow frustums of a cone are mounted above an uptake in such a manner that an aperture in the curved side walls of each communicates therewith, there being no communication between the frustums themselves, the frustums being arranged in relation to an air way so that the latter induces a draft in them and the uptake.

3. A top for ventilating shafts wherein two hollow truncated cones open at their tops into an air way but are separated from each other by baffling devices, apertures in the sides of said cones communicating with an uptake and a cross baffle joining the tops of the apertures in the sides of said cones, said cross baffle supporting the baffling devices for the open tops.

4. In tops for ventilating shafts an uptake a pair of hollow frustums and an open air way, said frustums being oppositely placed on a common center at right angles to said uptake and with their open tops exposed to said air way, passages in said frustums leading to said uptake, baffling means, same being arranged to separate the open tops of said frustums but to allow said passages to communicate with said uptake.

5. In tops for ventilating shafts, an uptake, a pair of hollow frustums and an open air way, said frustums being oppositely placed on a common center at right angles to said uptake and with their open tops exposed to said air way, passages in said frustums leading to said uptake, baffling means, same being arranged to separate the open tops of said frustums but to allow said passages to communicate with said uptake, and a supporting cover plate extending from the base of one frustum to the base of the other, forming a stay for the baffling means.

6. In tops for ventilating shafts, an uptake, a pair of hollow frustums and an open air way, said frustums being oppositely placed on a common center at right angles to said uptake and with their open tops exposed to said air way, passages in said frustums leading to said uptake and covers over the base of said frustums, baffling means, same being arranged to separate the open tops of said frustums, but to allow said passages to communicate with said uptake.

Signed at North Shields in the county of Northumberland, England, this 22nd day of June, A. D. 1909.

ROBERT RAWLING.
JOHN THOMAS WHITE.

Witnesses:
GEORGE WOOD,
C. HOPE.